Figure 1:
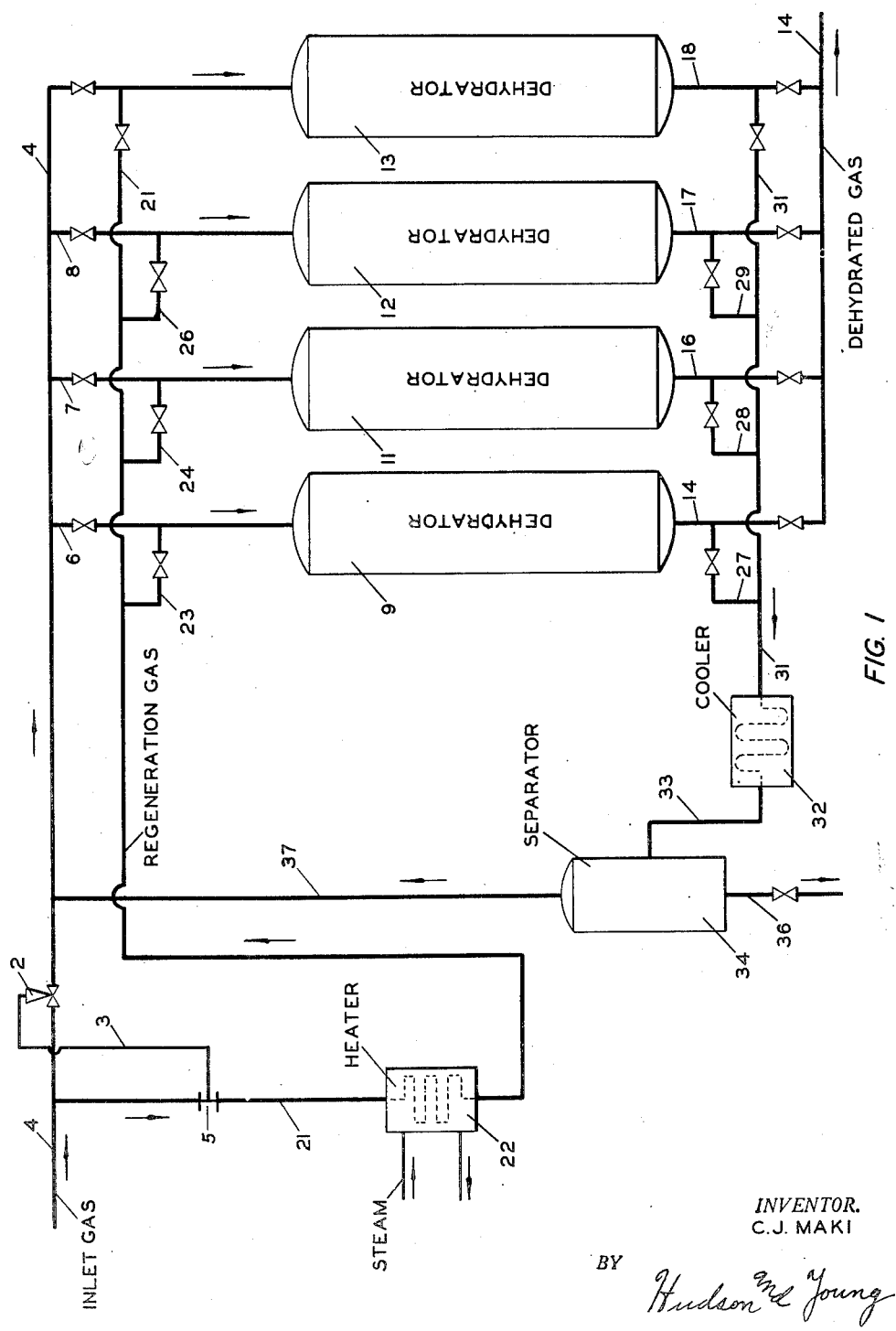

INVENTOR.
C. J. MAKI
BY Hudson and Young
ATTORNEYS

Patented Feb. 24, 1953

2,629,460

UNITED STATES PATENT OFFICE 2,629,460

PROCESS FOR THE DEHYDRATION OF FLUIDS

Carl J. Maki, San Tome, Venezuela, assignor to Phillips Petroleum Company, a corporation of Delaware Application March 4, 1946, Serial No. 651,959

2 Claims. (Cl. 183—114.2)

This invention relates to an improved process for the dehydration of fluids. In a particular aspect this invention provides an improved method for the removal of water from gases including hydrocarbons and the like by passing the substance to be dried through a bed of solid desiccant material. In another aspect this invention relates to a process and apparatus for the regeneration of a desiccant used for dehydrating fluids.

It is frequently desirable and many times necessary to remove either the greater portion of water or the last traces of moisture from gases. For example, the freezing troubles of the natural gas pressure systems caused by the formation of hydrates may be eliminated by removing a sufficient amount of the water vapor so that the dew point of the gas is at least as low as the minimum temperature of the gas at the maximum pressure. Also, it may be necessary to remove the last traces of moisture from certain organic substances as gasolines, alcohols, esters, etc., in the vapor phase to forestall detrimental catalytic effects or other adverse effects such as corrosion, and the like.

It is known that adsorbent materials such as bauxite, activated alumina, silica gel, and the like have desiccating properties, and that such materials may be reactivated and reused by heating to drive out adsorbed water. Fluids to be dehydrated are passed through beds of these granular adsorbent desiccants to obtain a degree of water removal depending on the adsorptive capacity of the desiccant. Such materials are often superior to solutions of inorganic salts or organic compounds, particularly for treating fluids which are miscible and/or reactive with aqueous solutions or which must be substantially completely dehydrated. In order to increase the capacity of a bed of a desiccant and lengthen its dehydration service, hygroscopic salts may be added and distributed over the adsorbent granules in such a manner that the adsorptive capacity of the desiccant is utilized to retain the solution and/or hydrate of the hygroscopic salt.

The above mentioned adsorbents have a limited capacity for water, and require reactivation or regeneration, which involves heating the entire bed and sweeping out the adsorbed water removable at the reactivation temperature.

In accordance with conventional practice solid desiccant materials which have become inactive due to adsorption of water are regenerated by heating the desiccant with hot gases. The hot gases are passed through the desiccant from which they extract the water as water vapor. The extracted gases containing the water vapor are either wasted or cooled below their dew point to condense the water vapor therein. In the latter instance the aqueous condensate is withdrawn and the gases are passed to a compressor or circulating blower after which they are heated to a suitable regeneration temperature and again passed into contact with the solid desiccant material. This cycle of operation is carried out continuously until the desired regeneration is obtained.

It is an object of this invention to dehydrate fluids containing water vapor.

It is another object of this invention to provide a novel method and apparatus for regenerating solid desiccants used to dehydrate gases containing water vapor.

It is still a further object to provide a continuous process for dehydrating gas with a solid desiccant and regenerating a solid desiccant with a portion of the gas to be dehydrated.

Another object is to provide a regeneration process for a solid dehydrating desiccant in which the desiccant is regenerated at substantially the same pressure as is used during dehydration of a fluid with said desiccant.

Other objects and advantages of this invention will become apparent to those skilled in the art from the accompanying description and disclosure.

The present invention provides a continuous process and apparatus for the dehydration of a non-aqueous gas containing a relatively minor amount of water, usually saturated with water vapor, in a plurality of contact zones containing solid adsorbent desiccant in which the gas is continuously passed through at least one of said contact zones to dehydrate the gas. On passing the gas containing the water vapor through the contact zones the desiccant ultimately becomes incapable of further dehydrating said gas to the desired water content, which necessitates passing the gas to another contact zone which is capable of dehydrating the gas to the desired water content. The desiccant in the contact zone previously used for dehydrating the gas is regenerated or reactivated to render it capable of further dehydrating the gas. In accordance with this invention a novel method and apparatus has been found to regenerate the spent desiccant with the same gas which is to be treated which comprises dividing the gas stream into a regeneration stream and a process stream, passing said process stream to a contact zone for removal of water therefrom, after the regeneration stream has been heated sufficiently to assure reactivation of a spent desiccant passing said regeneration stream to a contact zone containing a spent desiccant which is incapable of dehydrating gas to the desired water content, maintaining the regeneration stream at a substantially constant flow rate and at substantially the same pressure as the process stream, removing a regeneration effluent from the contact zone being regenerated, cooling this effluent sufficiently to condense water vapor, removing resulting aqueous condensate from said regeneration effluent, and passing the effluent from which water has been removed to the process stream prior to its introduction into a contact zone for dehydration thereof.

This invention has several advantages over conventional methods for regenerating desiccants used for dehydrating gases. The gases used for regenerating the desiccant according to the present invention are the same gases as those being dehydrated, thus obviating the necessity of having available a separate source of inert gases for the regeneration operation. Furthermore, using the fluid to be dehydrated as the regeneration gas is also a particular advantage as no detrimental effects on the desiccant are apparent. The use of other gases, such as gases containing oxygen or other active material, often results in chemical reactions, etc., which are detrimental to the desiccant. Another advantage of the present invention is that no compressors or blowers are required for the regeneration process or the recirculation of the regeneration gas. In addition the regeneration process is carried out at substantially the same pressure as the dehydration process which results in the ability to pass the regeneration gas into the feed to the dehydration process.

According to this invention a gas stream is divided into two streams, one of which is continuously passed to a dehydration zone while the other stream is passed at substantially the same pressure as the first stream to a contact zone for regeneration of that zone. The flow of the second stream for regeneration of the contact zone is maintained constant regardless of the demand or delivery requirements for dehydrated gases. This is accomplished by maintaining a flow control meter on the regeneration stream which is connected to a flow control valve on the process stream. The flow control valve on the process stream is so regulated that the back pressure on the source of the gas or the resistance to the flow of the gas in the process stream is sufficiently high at all times to maintain a constant flow in the regeneration stream. Since no compressors or blowers are used in the regeneration stream and since the regeneration stream is recirculated to the process stream, a progressively decreasing pressure exists on the regeneration stream caused by the resistance to flow through the regeneration circuit. The overall pressure drop on the regeneration circuit is relatively small and amounts to only a few pounds per square inch, usually less than 20 pounds.

The pressure of the inlet gas during both dehydration and regeneration may range from about atmospheric to about 1000 pounds per square inch gage depending on the composition of the gas to be dried. The pressure is, however, kept lower than the pressure necessary to liquefy the gas. To provide the greatest absorptive capacity during dehydration, the temperature of the inlet gases and the drying bed should be kept as low as possible, preferably within the range of 32 to 100° F. Higher temperatures may be used, but the efficiency and extent of dehydration is impaired thereby due to the increased vapor pressure of water in the desiccant with increasing temperature. The temperature of the regeneration gas may range from about 250 to about 600° F., depending on the desiccant employed. The preferred range is 400 to 600° F. when using materials such as bauxite and silica gel, although lower temperatures may be used with certain synthetic alumina.

The adsorbent materials that can be used in this invention are preferably such natural substances as bauxite, fuller's earth, acid clay, although excellent results are obtained at somewhat higher cost with such synthetic adsorbents as activated alumina and silica gel. These adsorbent materials may be activated before use by calcining at temperatures of 500 to 1500° F. The granular adsorbent materials are used in suitable particle size for permitting fluid flow without excessive pressure drop even in relatively deep beds and at flow rates consistent with efficient dehydration.

The hygroscopic salts referred to are of that class which are substantially inert toward the fluids treated and which have an affinity for water at the temperature range of the drying bed. These salts can substantially be dehydrated at the temperatures used for reactivation of the desiccant composition. Of these salts, the preferred one for this invention is lithium chloride. Other salts which are useful are calcium chloride, magnesium sulfate and chloride, and others having strong hydrate-forming tendencies.

This invention is applicable to the drying of such gases as air, oxygen, hydrogen, helium, butane, propane, natural gas, and by-product gas. This invention is suitable to the drying of gases which are saturated with water vapor in the range of temperatures and pressures specified in the operating conditions, namely 32 to 100° F. and atmospheric to 1000 pounds per square inch gage. The extent of drying can be carried to any desired level ranging from the water content of the incoming gas to substantially complete dryness.

Figure 2:
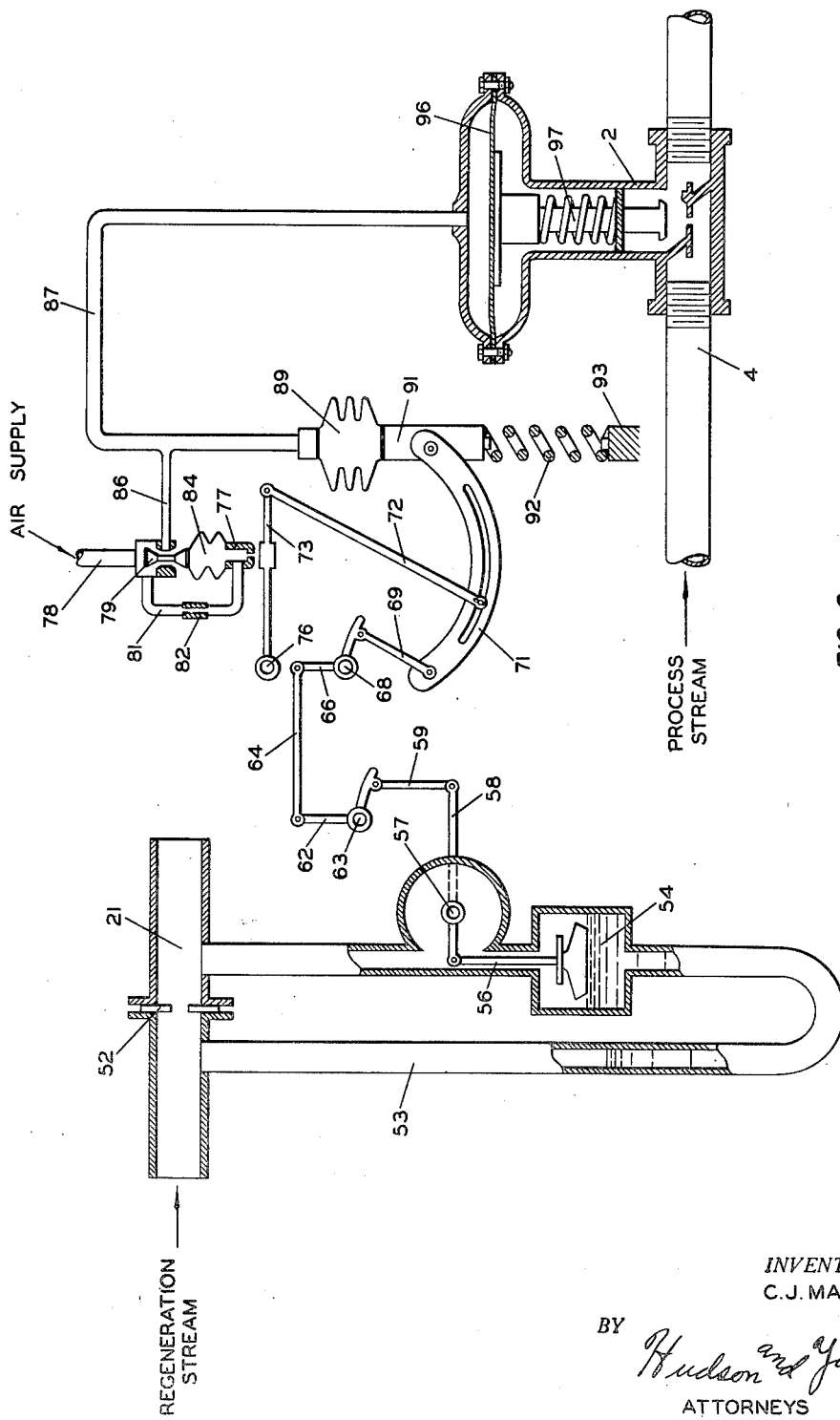

In order that this invention may be clearly understood reference will be made to the accompanying drawings which diagrammatically illustrate apparatus which may be used for a continuous dehydration and regeneration process. Figure 1 illustrates a dehydration system according to this invention, and Figure 2 is a more detailed illustration of a method of operating valve 2 of Figure 1.

In Figure 1 a gaseous mixture is passed through line 4 and lines 6 and 7 to dehydrators or contact zones 9 and 11, respectively, for removal of water vapor contained in the gaseous mixture. In a typical application of the present process a natural gas having the following composition is dehydrated:

| Component: | Mol per cent |
|---|---|
| Nitrogen | 12.92 |
| Methane | 77.99 |
| Ethane | 5.84 |
| Propane | 2.98 |
| Butanes | 0.21 |
| Pentanes | 0.06 |

The entering gas is at a pressure of about 325 pounds per square inch gage and at a temperature of about 75 to about 85° F. The natural gas is saturated with water vapor at this temperature and pressure. The gaseous mixture is dehydrated in contact zones 9 and 11 which contain solid desiccant material as previously described. The gaseous mixture, substantially free of water vapor, i. e. having a water vapor dew point below about −40° F. at 325 pounds per square inch gage, is removed from contact zones 9 and 11 through lines 14 and 16, respectively.

Contact zones 12 and 13 have previously been used for dehydrating the gas and are therefore incapable of dehydrating the gaseous mixture to the required water content, i. e. where the gaseous mixture has a water dew point of −40° F. at about 325 pounds per square inch gage. In order to regenerate contact zones 12 and 13 a portion of the gaseous mixture from line 4 is passed through line 21 and the rate of flow in line 21 is regulated by constant flow meter 5 which regulates valve 2 on line 4 by transmission means 3. The back pressure and the resistance to flow in line 4 is maintained sufficiently high that the flow through flow meter 5 is substantially constant. This regeneration stream through line 21 is passed to heater 22 where the gaseous mixture is heated to about 350° F. or higher and thence to contact zones 12 and 13 through lines 26 and 21, respectively. Heater 22 represents any conventional type of heating means using steam, direct fire or hot gases to furnish heat. The actual regeneration temperature of the desiccant is about 230° F. but to effect complete regeneration a temperature above about 350° F. should be used. A gaseous effluent is then passed from contact zones 12 and 13 through lines 29 and 18, respectively, to line 31. The gaseous effluent containing water vapor obtained from the reactivation of the desiccant in contact zones 12 and 13 is passed through cooler 32 and line 33 to a separator 34 in which an aqueous condensate is separated from the gaseous mixture. The gaseous effluent is usually cooled to about 80 to about 125° F. Gas is withdrawn from the upper portion of separator 34 through line 37 and an aqueous condensate is removed from separator 34 through line 36. From separator 34 the gaseous regeneration stream is passed to line 4 at a point down-stream from valve 2 through line 37. The resulting mixture is passed through contact zones 9 and 11 for dehydration. Obviously, various other conventional methods could be used to remove water from the regeneration effluent, such as by extraction, absorption, etc.

Separator 34 may be any suitable means for allowing a phase separation between the gaseous mixture and the aqueous condensate, such as a settling tank or tower, and phase separation may be accomplished either by gravitational or centrifugal methods.

After contact zones 9 and 11 become incapable of further dehydrating the gaseous mixture to the desired extent and contact zones 12 and 13 reactivated, the gaseous mixture from line 4 is passed to reactivated zones 12 and 13 through lines 8 and 4 and contact zones 9 and 11 are removed from process flow. Regeneration gas is then passed through contact zones 9 and 11 through lines 23 and 24 while contact zones 12 and 13 are on process flow. The gaseous effluent from contact zones 12 and 13, which are on process flow, are removed therefrom through lines 17 and 18 and passed to line 14. The regeneration stream passing through contact zones 9 and 11 is removed therefrom through lines 27 and 28, respectively, and passed to line 31. The previously described cycle of regeneration and dehydration is then repeated.

Figure 2 diagrammatically represents apparatus for the operation and control of valve 2 on line 4 of Figure 1 in response to the rate of flow of the regeneration stream through line 21. The method described in Figure 2 illustrates the use of air to operate automatic flow control valve 2 in line 4 and is only one of many possible methods which may be used in this invention. A flow meter is attached to line 21 which regulates the supply of air to flow control valve 2 on line 4. Element 52 is an orifice inserted in line 21. A manometer 53 is supplied for measuring the change of pressure through the orifice which is recorded by the level of mercury 54 in the manometer. The level of mercury in manometer 53 operates float 56 which in turn operates arm 58 through permanent bearing 57 in the housing of manometer 53. The change of position of arm 58 ultimately operates flapper 73. The operation of flapper 73 is accomplished by connecting arm 59, lever arm 62 attached to permanent bearing 63, connecting arm 64, lever arm 66 attached to permanent bearing 68, arm 69, flapper actuating arm 71, and link 72. As a result of the movement of flapper 73 on permanent bearing 76 the supply of air to capsular chamber 84 is controlled. Capsular chamber 84 expands and retracts operating valve 79 according to the pressure of air in the chamber. Air is supplied through line 78 which by-passes through line 81 and restriction 82 to capsular chamber 84. Flapper 73 releases air from capsular chamber 84 and line 81 through a nozzle 77. The operation of valve 79 determines whether air from line 78 is supplied to line 87 or whether air from line 87 is exhausted through valve 79 as shown, resulting in the operation of valve 2 on line 4. Air conduit 86 communicates between valve 79 and conduit 87. Conduit 87 for the passage of air therethrough communicates between valve 2 and bellows 89. Bellows 89 is operated by the air pressure within conduit 87. The movement of bellows 89 moves arm 91 supported on spring 92 and base 93. The operation of arm 91 in turn operates flapper actuating arm 71. The operation of bellows 89 prevents the fluttering of flapper 73 and also the fluttering of valve 2 by proportioning or cushioning the air supply to valve 2. Valve 2 is operated by the pressure or air on diaphragm 96. Diaphragm 96 moves valve stem 97 to the desired position in valve 2 to regulate the flow of gases through line 4.

The orifice-type flow meter, as described in Figure 2, may be replaced by other conventional types of differential pressure flow meters such as a Venturi tube type, a flow nozzle type, or a Pitot tube type. Area meters, rotameters, antimanometers, electrical meters, and volumetric type flow meters may be employed for measuring the flow through line 21 without departing from the scope of this invention. Various other means other than air may be used to actuate valve 2. Such methods include liquid and electrically operated valves.

While the invention has been described with specific reference to the preferred operating conditions and specific materials, it will be understood that the application is of broad scope and general application. Various modifications of alternating process and regeneration flow and directing the gases to contact zones may become apparent to those skilled in the art without departing from the scope of the invention. The invention is equally applicable to two contact zones as well as more than two contact zones, and various types of valves and arrangement of conduits may be employed to pass the regeneration stream and process stream to the desired contact zones at the appropriate times.

Having described my invention, I claim:

1. A process for dehydrating a non-aqueous gas containing water vapor which comprises, passing a stream of said gas through a conduit at a temperature between 32 and 100° F. and a superatmospheric pressure less than that which will cause liquefaction thereof at said temperature, dividing said stream into a major portion and a minor portion, reducing the pressure on said major stream to a pressure not greater than that of a cool regeneration effluent gas as hereinafter recited, and varying the extent of said pressure reduction in conjunction with the rate of flow of said minor stream to maintain said rate of flow constant, heating said constant volume stream to 400 to 600° F., passing said heated stream through a bed of wet granular adsorbent and effecting a regeneration thereof, cooling the resulting gaseous regeneration effluent to 80 to 125° F., removing from said cooled regeneration effluent stream resulting condensed liquid water, mixing said major stream of reduced pressure and said cooled regeneration stream at said pressure, and subsequently passing the combined streams at a temperature between 32 and 100° F. through a bed of solid granular water-adsorbent material, and recovering a resulting stream of dried gas having a pressure less than and a quantity equal to the first said stream of gas.

2. A process for dehydrating a non-aqueous gas containing water vapor which comprises, passing a stream of said gas through a conduit, dividing said stream into a major portion and a minor portion, reducing the pressure on said major stream to a pressure not greater than that of a cooled regeneration effluent gas as hereinafter recited and varying the extent of said pressure reduction in conjunction with the rate of flow of said minor stream to maintain said rate of flow constant, heating said constant volume stream and passing said heated stream through a bed of wet solid granular adsorbent and effecting a regeneration thereof, cooling the resulting gaseous regeneration effluent, removing from said cooled regeneration effluent stream resulting condensed liquid water, mixing said major stream of reduced pressure and said cooled regeneration stream at said pressure, and subsequently passing the combined streams through a bed of solid granular water-adsorbent material, and recovering a resulting stream of dried gas having a pressure less than and a quantity equal to the first said stream of gas.

CARL J. MAKI.

REFERENCES CITED

The following references are of record in the file of this patent:

UNITED STATES PATENTS

| Number | Name | Date |
|---|---|---|
| 1,713,833 | Kochendorfer | May 21, 1929 |
| 1,721,033 | Okochi | July 16, 1929 |
| 1,948,779 | Abbott et al. | Feb. 27, 1934 |
| 2,345,774 | Simpson | Apr. 4, 1944 |
| 2,359,660 | Martin et al. | Oct. 3, 1944 |